United States Patent Office 3,459,938
Patented Aug. 5, 1969

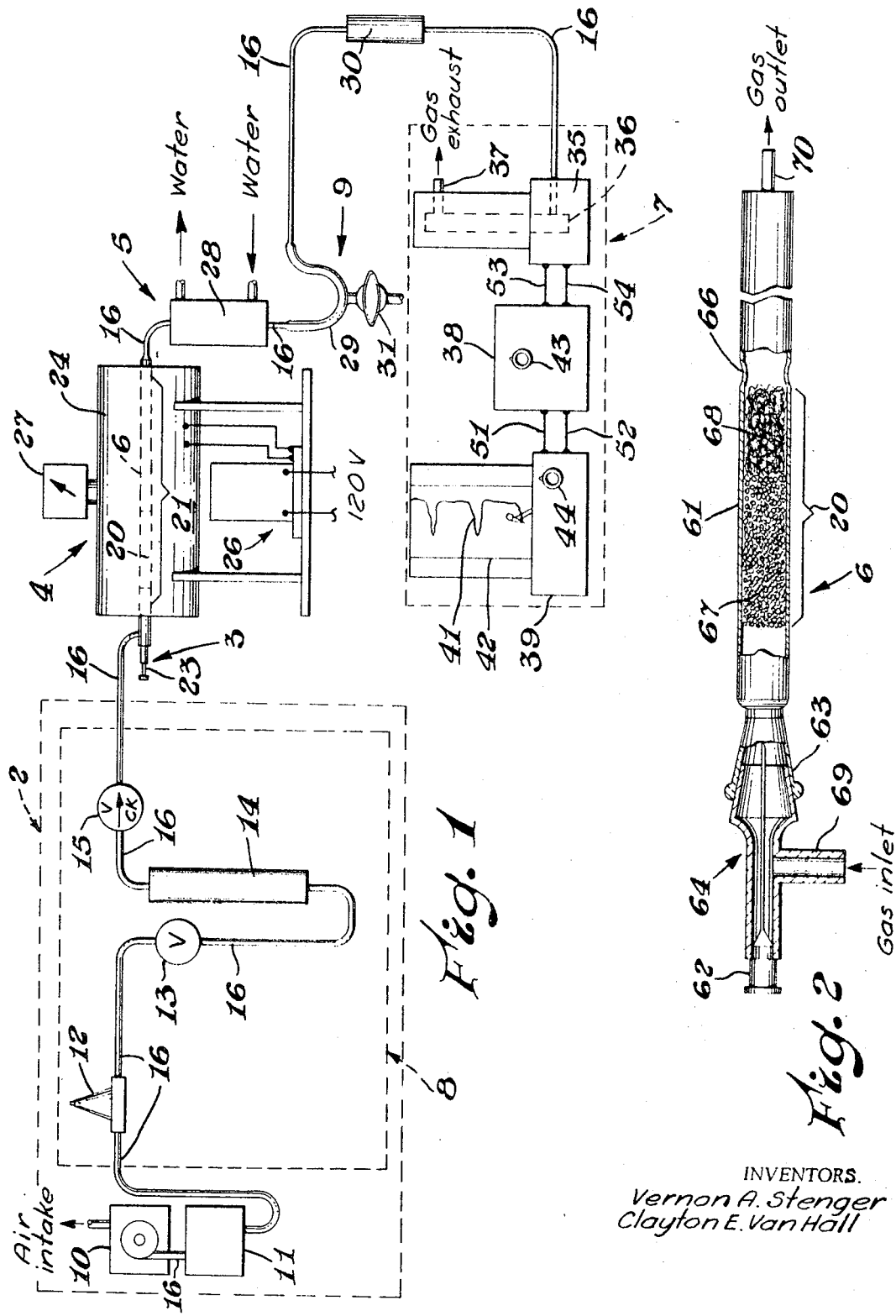

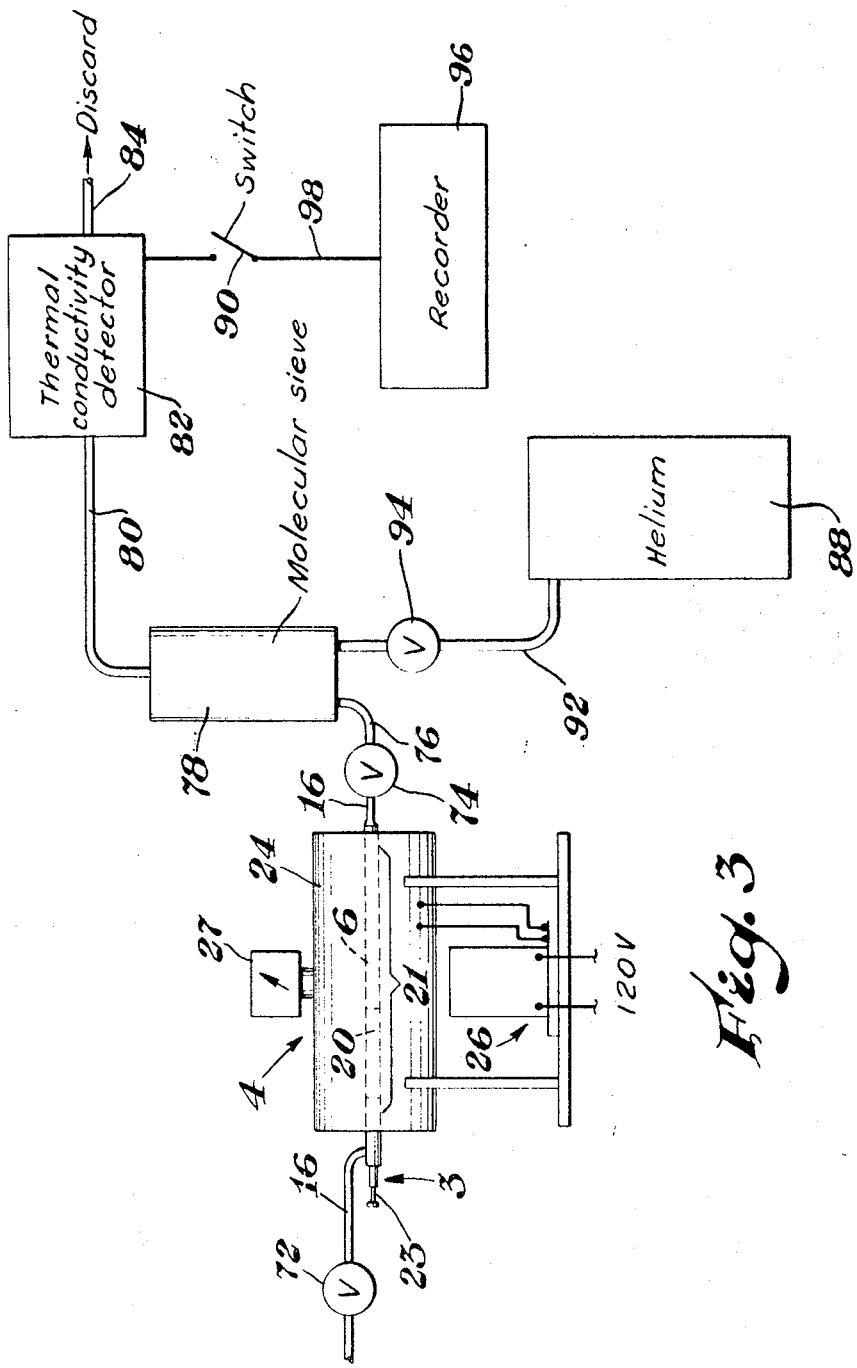

3,459,938
METHOD AND APPARATUS FOR DETERMINING THE INORGANIC CARBON CONTENT IN A LIQUID
Vernon A. Stenger and Clayton E. Van Hall, Midland, Mich., assignors to The Dow Chemical Company, Midland, Mich., a corporation of Delaware
Continuation-in-part of application Ser. No. 489,252, Sept. 22, 1965. This application Feb. 1, 1968, Ser. No. 709,157
Int. Cl. G01n 21/26; H01j 37/24
U.S. Cl. 250—43.5                                    21 Claims

ABSTRACT OF THE DISCLOSURE

This invention relates to an analytical method and apparatus for determining the inorganic carbon content of a liquid, usually by passing a carrier gas stream substantially free of carbon dioxide through a heating conduit having a heating zone at a temperature above about 100° C. and below that temperature at which organic components of the liquid undergo decomposition, within which heating zone there is an acid-surfaced, carbonate-reactive body, forcibly injecting a small predetermined amount of the liquid to be analyzed onto the carbonate-reactive body, and then sweeping the gaseous product formed in the heating zone into an analyzer for quantitatively indicating the carbon dioxide content of a gas stream alternatively, the carrier gas may be used only to sweep the gaseous reaction products and un-reacted sample from the conduit to the analyzer.

---

This is a continuation-in-part of our co-pending application Ser. No. 489,252, filed Sept. 22, 1965, for "Analyzing for Inorganic Carbon in Liquids," now abandoned.

The present invention concerns a novel analytical method and apparatus for determining the inorganic carbon content of liquids. For purposes of the invention, the measured inorganic carbon content consists of only carbon present in the liquid as bicarbonate and carbonate radicals or dissolved carbon dioxide.

Although the invention is applicable to almost any type of organic or aqueous liquid, it is most useful as applied to aqueous dispersions of carbonaceous materials. The need for improved analytical techniques, which discriminate between the organic and inorganic carbon contents of aqueous dispersions, is most evident in the search for water pollution measuring and control techniques.

A previously proposed method for measuring inorganic carbon contents of aqueous dispersions involved measuring the difference between the total carbon content and the organic carbon content of a particular system. For instance, the system to be analyzed was acidified and blown with an inert gas. Acidification converted any carbonate present to carbon dioxide and the blowing removed the carbon dioxide from the system. The blown system was then analyzed for its total carbon content. One method for accomplishing this is described in the co-pending application Ser. No. 380,597, filed July 6, 1964, now U.S. Patent No. 3,246,435. Such a procedure is subject to an error since some portion of any volatile organic carbon present in the system is removed upon blowing. The organic carbon removed by blowing is read as inorganic carbon and correspondingly the organic carbon is read too low in a like amount.

Although the foregoing method is useful to a degree, the error introduced in the measurement as the result of the presence of volatile organic materials, as well as some rather cumbersome and subjective laboratory techniques for removing inorganic carbon, call for an improved method for the determination of inorganic carbon in liquids such as aqueous dispersions.

It is a purpose of the present invention to provide a convenient and rapid analytical method for determining the inorganic carbon content of liquids, especially aqueous systems containing small amounts of highly dispersed carbonaceous matter. A related purpose, however, is to provide a method for determining the inorganic carbon content of any liquid including organic solvents. In particular, it is a major purpose of the invention to provide apparatus for carrying out the aforesaid described method. Other objects of the invention include providing an analytical technique conveniently adaptable for automation and thus convenient integration into water monitoring and control purposes. Further benefits of the invention will become apparent in the full description thereof set forth hereinafter.

In accordance with the invention, an analytical method is provided whereby the inorganic carbon content of a liquid is rapidly determined with an accuracy of plus or minus a few parts per million. The method comprises the following operations. A heated zone is provided within a conduit. Contained within the heated zone of the conduit as an acid-surfaced, carbonate-reactive body. This body may occupy only a portion of the transverse cross-section of the conduit, but preferably it occupies the entire transverse cross-section. In the latter instance it must be gas-permeable. A small amount of the liquid to be analyzed is forcibly directed onto the carbonate-reactive body within the heated zone of the conduit.

At the temperature of the heated zone, the volatile components of the liquid are largely vaporized without oxidation. Any dissolved carbon dioxide is thus released. In addition, vaporization deposits non-volatile inorganic carbonates on the carbonate-reactive body. At the elevated temperature of the heated zone, such carbonates readily liberate carbon dioxide upon contacting the acid surface of the carbonate-reactive body. The product gases are swept from the heated zone by flowing a carrier gas through the zone and thence into an analyzer for quantitatively determining the carbon dioxide content of a gas stream. Preferably, the analyzer is one which provides an electrical signal, e.g. electrical voltage, the strength of which is proportional to the concentration of the carbon dioxide in the gas.

A particular, and preferred, analyzer is a non-dispersive-type, infrared analyzer sensitized for carbon dioxide analysis. The construction of these analyzers and the manner in which they are operated are described in such references as United States Patents 2,698,390; 2,681,415; and 2,709,751.

The voltage signal output from such carbon dioxide analyzer is adapted by suitable amplifiers, e.g., that described in U.S. Patent 2,413,788, and graphic recorders to provide readings which can be converted to or read directly as inorganic carbon concentrations in the sample analyzed. Conversion is accomplished by comparing the signal reading against standard calibration curves prepared by analyzing known samples under comparable operating conditions.

To provide comparable analytical readings for such purposes, care must be exercised to insure that sample volume, amplifier gain and recorder voltage range settings are at predetermined identical values and further that the temperature and the carrier gas flow rates employed during the analytical operations are identical, or at least within operational levels at which the analytical results are independent of these variables.

In a preferred embodiment wherein analytical results are obtained as a curve whose amplitude is a function of carbon dioxide concentration in the gaseous product, the actual inorganic carbon content of the liquid tested is correlated with the maximum amplitude, or peak, of the curve. Having previously calibrated such readings, direct readings of the peak ordinates give the inorganic carbon concentration in the liquid tested.

The carrier gas stream is usually substantially free of carbon dioxide. Best results are achieved if it does not exceed about 50 parts per million by weight of carbon dioxide. Otherwise it may consist of any material which is normally gaseous at room temperature, inert to carbon dioxide and preferably non-basic. Practically, the gases of choice are nitrogen, argon, helium, and purified air. If desired, pure oxygen can even be used, provided the heated zone is maintained at temperatures in the lower region of the specified temperature range. A carrier gas in which the carbon dioxide is a component present in a substantial but constant amount is also useful in some situations.

Good results are obtained by maintaining the heated zone at a moderately elevated temperature within the range from about 100° up to about 250° C. Preferably the heated zone is maintained at a temperature of about 150° to 200° C. Higher temperatures tend to produce interferences from oxygenated organic materials which decompose at relatively low temperatures to form carbon dioxide. In any event, the heated zone is maintained at a temperature below that at which significant combustion or decomposition occurs with respect to organic components in the sample analyzed and above the temperature required to vaporize the liquid sample.

The carbonate liberating or carbonate-reactive body contained within the heated zone of the conduit may occupy all, or only a portion, of the transverse cross-section of the heating zone. If it occupies the entire cross-section, this body should be sufficiently permeable to permit the flow of the carrier gas and intermittently volatilized liquid samples without causing excessive back pressure. The carbonate-reactive body is composed of materials which do not absorb carbon dioxide. Usually the carbonate-reactive body is formed from particulate solids having an acidic coating. Manifestly such solids must be chemically inert to acids.

Acids or acidific materials used in forming the coating include strong, non-oxidizing acids. For best results they are essentially non-volatile protonic acids. Preferred acids include the various oxyacids of phosphorus such as orthophosphoric, hexametaphosphoric and pyrophosphoric acids. Also useful is sulfuric acid which has been diluted enough to be non-oxidizing. Organic acids that may be used at sufficiently low temperatures to avoid decomposition include terephthalic acid and benzene sulfonic acid. The acids can be applied to quartz chips, quartz wool, acid-resistant particulate thermoset plastics, silica, acid-inert metal chips and the like to prepare acid surfaced particulate matter for the carbonate-reactive body.

In preferred practice, the carbonate-reactive body occupies the entire cross-section of the conduit within the heated zone and the liquid sample to be analyzed is rapidly injected or otherwise introduced into the heated zone in a direction usually, but not necessarily, essentially parallel to the direction of carrier gas flow through the conduit so as to impinge upon the carbonate-reactive body. Alternately, the carbonate-reactive body is placed within the heated zone and a liquid sample injected or dropped through any part in the conduit affording access to the interior of the heated zone and the carbonate-reactive body. Upon introduction of the liquid to be analyzed, its resulting impingement upon the heated reactive body promotes rapid volatilization of its components. Deposition of any bicarbonate or carbonate radicals contained within the liquid causes the liberation thereof as carbon dioxide into the carrier gas stream.

As the gas stream continues to flow through the heated zone the volatilized vapor, including evolved carbon dioxide is usually cooled to a temperature at or below that of the apparatus subsequently used for detecting the carbon dioxide. Normally, the gaseous product will be reduced to about normal room temperatures. As the gases cool, condensate may be formed. Such condensate is collected in a trap from which accumulated liquid can be withdrawn intermittently. Although uniform cooling of the gaseous product, and thus consistent separation of condensate from the cooled gases, is desirable for optimum operation, good results can also be achieved by operating with only minimal cooling of the gaseous product such as would occur incidentally while conveying the gases into the analyzer through air-cooled tubing. It is possible to carry out the process, such that no condensate forms, by operating the analyzer at an elevated temperature above the dew point of the product gas stream.

Typical apparatus for carrying out the above-described analytical process is illustrated in the accompanying drawings. FIGURE 1 is a schematic drawing of a complete apparatus suitable for accomplishing the analysis of liquid systems for their inorganic carbon content in accordance with the invention. FIGURE 2 shows the general configuration of a representative carbon dioxide liberating, heated conduit containing the essential acid-surfaced carbonate-reactive body. FIGURE 3 shows alternative apparatus for carrying out this invention which utilizes a molecular sieve.

The apparatus illustrated in FIGURE 1 comprises the basic components of a carrier gas supply means 2, liquid sample injection means 3, heating means 4, in which there is situated a heating conduit 6, and carbon dioxide detection means 7. The heating conduit 6 contains an acid-surfaced carbonate-reactive body 20 for liberating carbon dioxide.

More particularly, there is shown in the illustration preferred embodiment regulated carrier gas supply means 2 which comprises an air pump 10 and air purification means 11 for removing carbon dioxide. Through these apparatus components, air essentially free of carbon dioxide is forced into carrier gas flow control means 8, which in the illustrated embodiment consists of a series arrangement of a pressure regulator 12, valve 13, flow meter 14, and back flow check valve 15. These elements of the apparatus are operatively coupled in the order specified with suitable interconnecting gas conduits 16. Subsequent to the check valve 15, the gas stream is fed into the inlet end of the heating conduit 6. This end of the conduit is adapted to receive sample injection means 3, such as the illustrated syringe 23.

The heating conduit 6 has a heating zone 21 defined as that portion of the conduit situated within the heating means 4. In the illustration, the heating means 4 is an electric furnace 24. This furnace is regulated by means of a variable power control 26. Temperature readings within the heating means 4 are obtained by means of a pyrometer 27.

Gaseous products from the heating zone 21 of the heating conduit 6 are passed through cooling means 5, which, in the illustrated preferred embodiment, consists of a water-cooled condenser 28 connected in series with condensate removal means 9 and an optional gas filter 30. The illustrated condensate removal means 9 consists of a U-shaped condensate trap 29 equipped with a stopcock 31 for intermittent liquid drainage. The water-cooled condenser 28 receives effluent gases directly from the heating conduit 6 and it discharges them directly into the condensate tray 29.

The components through which gas flow occurs are interconnected with tubing connections 16 to provide a gas train.

The carbon dioxide detection means shown in FIGURE 1 consists of an electrically connected association of a non-dispersive, carbon-dioxide-sensitized, infrared analyzer 35 which produces a variable voltage signal to be amplified by means of a low voltage amplifier 38. The enhanced electrical signal is then fed into a continuous graphic recorder 39, which produces a curve 41 on a continuous strip of paper 42. The amplitude of, or the area under, the curve 41 is a function of the carbon dioxide concentration in the detection cell 36 of the infrared analyzer 35. After passing through the detection cell 36 the gaseous product is discharged to the atmosphere through a vent 37. Controls in the detection means 7 are the amplifier gain control 43 and the recording voltage range control 44.

In FIGURE 2, the heating conduit 6 and carbonate-reactive body 20 are shown in more detail. The heating conduit 6 consists of two separable parts which are an inlet 64 and a cylindrical quartz tube 61. Seated within the inlet 64 is an injection tube 62 adapted to receive injection means in the form of a syringe. The injection tube 62 is aligned in a direction essentially parallel to the longitudinal axis of the tube 61. The inlet 64 is coupled with the cylindrical tube 61 through a ground glass joint 63. Within the cylindrical tube 61 is an acid-surfaced, carbonate-reactive body 20 composed of a phosphoric acid coated packing of quartz chips 67 backed up with quartz wool 68. Each end of the assembled heating conduit 6 is adapted for coupling with preceding and succeeding apparatus elements. The inlet and outlet are small tubular nipples 69 and 79, respectively.

Although certain preferred embodiments of the above-described apparatus components have been set forth, numerous alternatives will occur to those skilled in the art. For instance, with regard to carrier gas supply means 2, it is only necessary that there be provided a confined stream of gas subject to flow rate control. Knowledge of the actual flow rate is not necessary, so long as the gas flow rate can be controlled to a constant rate. Desirably, however, the flow rate can be predetermined. To this end any combination of mechanical means for supplying and regulating a flowing gas stream can be used in place of that illustrated.

Insofar as heating means 4 is concerned, any apparatus capable of providing controlled heating over a moderately elevated temperature range can be used, e.g., from near 100 to about 250° C. Similarly, sample injection means 3 can be provided by mechanical apparatus suitable for supplying measured aliquots of a liquid and forcibly injecting them onto the carbonate-reactive body of the heating conduit 6. For example, insertion of the liquid sample to be analyzed into the heating conduit can be accomplished by gas-driven sprayers adapted to provide controlled amounts of spray.

Cooling and elimination of resulting condensate from the carrier gas stream are optional procedural steps since condensate does not interfere with all quantitative carbon dioxide detection techniques. If desired, however, cooling of gaseous products from the heating conduit can be accomplished to the extent desired in a conventional manner such as by passing them through the described water-cooled condenser 28. Alternately, air-cooled condensers, which may be simply the coupling tubing between the heating conduit 6 and the analyzer 7, are also effective for this purpose.

Although it is not necessary, it is preferred to employ a gas filter 30 which retains any particles entrained in the gaseous product prior to its introduction into the detection cell of the analyzer. Infrared carbon dioxide detectors are preferred, but any analytical apparatus capable of indicating the quantity of carbon dioxide in the gaseous product with desired sensitivity and specificity can be used.

Since only low temperatures are involved, a wide variety of materials of construction can be employed in the gas train. Moreover, it is desirable, at least in the gaseous product train following the heating conduit, that materials of construction be essentially non-adsorbents for carbon dioxide. Within the heating zone itself, it is necessary that the materials of construction be inert to the carrier gas at the elevated temperatures used for liberating the carbon dioxide on the carbonate-reactive body. Such materials include, for example, fused silica, Vycor glass, glazed ceramics and the like inert materials.

In a specific embodiment of the above-described apparatus shown in FIGURE 1, rubber tubing was utilized to provide the connecting conduits 16. The gas stream pressure regulator 12 was a Watts Regulator Type 26 Model M1 and the valve 13 consisted of a Hoke needle valve. A combination of a precision sapphire ball within a Fisher-Porter Flow Metering Tube 08F–16–20–4/74 served as the flow meter 14. The check valve 15 was a Kimble Valve No. 38006. The heating conduit 22 was heated with an electric muffle furnace 24 operating on a voltage of 120 volts and a maximum power consumption of 700 watts. The power control 26 was a Powerstat variable voltage transformer.

The heating conduit 6 was constructed as shown in FIGURE 2. The tube 61 was made of fused silica. It had an inside diameter of 1.27 centimeters and a length of about 40 centimeters. A gas inlet 64 was provided in the form of a tubular glass T, with the cross bar of the T having a Vycor ground glass joint 63 at one end for coupling with the fused silica tube 61 and a No. 18 stainless steel syringe needle 62 about 5.2 centimeters long seated in the opposite end of the cross bar as receiving means for sample injection means in the form of a syringe. When the components of the heating conduit 6 were assembled, the needle 62 was directed in a line essentially parallel with the longitudinal axis of the tube 61. The stem of the tubular glass T provided a nipple 69 for connection with a 3/16 inch gum rubber conduit 16, connecting the heating conduit 6 with the carrier gas supply means 2. A Hamilton No. 705N syringe 23 was employed as the injection means 3.

Within the tube 61, and against a retaining indentation 66, about 24 centimeters from the inlet end thereof, was placed a gas-permeable carbonate-reactive body 20 about 11 centimeters long. This was constructed of 6–12 mesh quartz chips 67 and quartz wool 68. The materials were placed in the heating conduit 60 by gently tamping quartz wool into place against the retaining indentation 66 with a glass rod and adding sufficient quartz chips to make a packing 11 centimeters long. The support materials were then given an acid coating by pouring 10 cubic centimeters of 85% phosphoric acid through the tube.

After assembling its component parts, the heating conduit 60 was placed within the electric muffle furnace 24 so that the tip of the syringe needle 62 was just outside the heating zone 21 of the furnace 24 but in position such that, upon injection of the aqueous sample, the full amount thereof was deposited within the heating zone 21 on the carbonate-reactive body 20.

The gaseous products produced upon injection of a test sample were conducted through a gas train consisting of a series arrangement of a water-cooled condenser 28, a U-shaped water trap 29 and a gas filter 30 containing a 10–13 micron filtering element. The water trap 29 was adapted for intermittent drainage of accumulated water by means of a stopcock 31. The interconnecting gas conduits 16 consisted of 3/16 inch gum rubber tubing.

Carbon dioxide detection means 7 employed with the foregoing apparatus consisted of an infrared analyzer 35 (Beckman Model 21A) equipped with a 13.3 centimeter detection cell 36 sensitized for analysis of carbon dioxide. The detection cell 36 was maintained at a temperature of 45° C. to prevent the formation of condensate which would interfere with the accuracy of the analytical result. Output from the analyzer 35 was fed by electrical leads 53 and 54 to a low voltage amplifier 38. Subsequently, the amplified output of the analyzer was fed into a graphic recorder 39 (Sargent Model MR) through electrical leads 51 and 52. The recorder 39 was set by the voltage recording range control 44 to operate in the 0–5 millivolt range. The gain control 43 of the amplifier 38 was set at a predetermined level to provide a desired response in the recorder 39.

To carry out the described analytical technique, it is necessary to select a suitable sample size. This may be as little as about 1 microliter up to as much as 100 milliliters. The smaller the sample the longer the carbonate-reactive body lasts. A preferred sample size is within the range from 5 to 40 microliters. When beginning a particular analysis, the heating means 4 is turned on and brought to a temperature within the range from about 100 to about 250° C., preferably from about 150 to 200° C. Within the preferred temperature range, the sample is volatilized rapidly without decomposition of most organic materials occurring. The carrier gas, i.e., the air pump, is also turned on and the flow rate adjusted to a desired constant level so as to provide from about 0.5 to about 10, preferably 1 to 4 bed volumes thereof per minute. The bed volume is defined as the void space with the heating zone of the heating conduit. Depending on the size of the bed volume, the carrier gas flow rate can be within the range from as little as 10 to as much as 800 cubic centimeters (S.T.P.) per minute.

It is to be noted that the gas flow rates for best results will depend somewhat upon the bed volume. For instance, small bed volumes with high gas flow rates, or large bed volumes with gas flow rates that are too low, will tend to produce erratic analytical results. Also, in this connection, it is to be pointed out that while integration calculations can be used to correlate the recorded signal with actual inorganic carbon contents in samples analyzed, the most convenient and rapid evaluation of the recorded signal is made by considering only the amplitude (peak height) of the recording curve. To obtain well defined amplitude, or sharp peaks, bed volume and gas flow rate conditions should be adjusted in order to produce curves having amplitudes well defined within a relatively short period, e.g., from as little as 3 seconds up to about 50 seconds. For this purpose, several trial runs utilizing varying gas flow rates with a given heating conduit 6 and reactive body will provide basis for the selection of an efficacious gas flow rate.

Liquids to which the process and apparatus of the invention are applicable include both aqueous solutions and dispersions of inorganic carbon materials. In addition organic liquid solutions and dispersions can be analyzed for their inorganic carbon content. Although best results are obtained if the sample does not contain in excess of 500 p.p.m. of inorganic carbon, it is possible to analyze liquids with much larger amounts of such carbon forms.

Using the apparatus hereinbefore specifically described, a number of experiments were performed to demonstrate the validity of the analytical technique and its useful application. In one series of experiments, the heating zone was maintained for successive evaluations of a given composition at temperatures of 175° C., 200° C., 225° C. and 250° C. The bed volume of the heating conduit was 50 cubic centimeters. Phosphoric acid-coated quartz chips and quartz wool were used to prepare a carbonate-reactive body approximately 10 centimeters long within the heating conduit. Essentially carbon dioxide-free air was employed as a carrier gas at a flow rate of approximately 70 cubic centimeters per minute (S.T.P.). For the specified bed volume, very little variation in the recorder output was found at flow rates from 40 up to 200 cc. per minute.

Several materials were tested for possible interference with the analytical method. One group of organic compounds was selected on a basis of their ability to form carbon dioxide either by direct decomposition or acid hydrolysis. Enough of each of these materials was dissolved in water to provide a possible (if decomposition were to go to completion) 100 milligrams of apparent carbonate-carbon per liter. The results of these experiments are set forth in the following Table 1.

TABLE I

| Substance | Concentration, g/l. | Interference | | | |
|---|---|---|---|---|---|
| | | 175° C. | 200° C. | 225° C. | 250° C. |
| Urea | 0.5000 | No | Slight | Yes | Yes |
| Oxalic acid | 1.0506 | No | Yes | Yes | Yes |
| Calcium acetate | 1.4682 | No | No | No | No |
| Formic acid | 0.4306 | No | No | No | No |
| Methanol | 0.2670 | No | No | No | No |
| Butyric acid | 0.7342 | No | No | No | No |
| o-Phthalic acid | 1.3844 | No | No | No | No |
| Benzoic acid | 1.0177 | No | No | No | No |
| Dl-malic acid | 1.1174 | No | Slight | Yes | Yes |
| Malonic acid | 1.0406 | No | do | Yes | Yes |
| Citric acid | 1.6010 | No | do | Yes | Yes |
| Chloroform | 0.9949 | No | No | No | No |
| Acetic acid | 0.5000 | No | No | No | No |
| Picric acid | 2.1214 | No | No | No | No |
| Tartronic acid | 1.0000 | Yes | Yes | Yes | Yes |
| Sucrose | 2.8525 | No | Yes | Yes | Yes |

From the foregoing it is evident that the presence of certain materials in a liquid to be analyzed can interfere with obtaining an accurate inorganic carbon reading, i.e., they give a higher than actual carbonate-carbon reading. The process is still useful at the higher temperatures at which interferences developed, however, due to the fact that interfering substances are relatively rare. Many useful applications can be found for the method and apparatus at the higher temperatures.

In further runs, other acid coatings were substituted for the phosphoric acid with successful results. The other acids included 42% aqueous phosphoric acid and 50% aqueous sulfuric acid.

Further experiments using aqueous solutions of acetic acid and sodium carbonate, as well as mixtures thereof, were carried out using the above method. The solutions were made up to contain 100 milligrams per liter of total carbon. The results of these experiments with the analytical method described above are set forth in the following table.

TABLE 2

| Test solution No. | Theoretical Carbon (mg/l) | | Carbon Found (mg./l.) | |
|---|---|---|---|---|
| | From HOAc | From Na₂CO₃ | Carbonate | Non-vol.[1] |
| A | 50 | 50 | 50 | 51 |
| A | 50 | 50 | 50 | 50.5 |
| B | 100 | 0 | nil | 100 |
| C | 0 | 100 | 100 | nil |

[1] Obtained by analysis for total carbon after removal of carbon dioxide by acidification and blowing.

Another embodiment of this invention is shown in FIG. 3, in which corresponding reference numerals refer to corresponding parts in FIG. 1.

Valves 72, 74 are coupled across the tubes 16 at the input and output of the heating conduit.

A tube 76 connects the valve 74 to the input end of a molecular sieve 78 which is, as in well known in the art, adapted to retain carbon dioxide while passing other materials. The output of the molecular sieve is passed by means of a tube 80 to a thermal conductivity detector 82 and thence through tube 84 to discard, for example.

The electrical output of the detector 82 is coupled to a suitable recorder 96 by means of a cable 98 which has a switch 90 interposed between the detector 82 and the recorder 96.

A container 88 of pressurized, heated helium is coupled through a tube 92 and valve 94 to the input end of the molecular sieve 78.

The operation of the embodiment of the invention may be as follows with valves 72, 74 closed, sample liquid is applied to the carbonate reactive body in the heating conduit by means of the syringe 23, for example. After the sample has had sufficient residence time on the heated carbonate reactive body, say 30 seconds, for example, the valves 72 and 74 are opened (with valve 94 closed) and carrier gas (as used in connection with FIG. 1) is introduced into and through the heating conduit, forcing vaporized or gaseous materials in the heating conduit into the molecular sieve 78.

Carbon dioxide is retained on the sieve while the carrier gas and other materials pass through the detector 82 and are, for example, then discarded. During the time that materials other than carbon dioxide and carrier gas pass through the detector 82, the switch 90 may, if desired, be opened and the recorder drive mechanism stopped.

Then, after the heating conduit is cleared of volatile sample material, the valve 74 is closed. The valve 94 is opened and heated helium or other suitable carrier gas is fed into the input end of the molecular sieve 78, releasing the carbon dioxide and passing it, along with the carrier gas, through the detector 82 whose electrical output is now coupled to the operating recorder 96 to provide an indication of the amount of carbon dioxide which is present in the vaporized sample liquid.

The heating conduit is then ready to receive new sample liquid.

If the check valve 15 (in FIG. 1) is in operation, the valve 72 may be eliminated or left open, and only the valve 74 is closed until the volatilized sample and carrier gas are to be passed through the molecular sieve 78.

The analytical method of the invention can be used to determine the inorganic carbon content of any of a wide variety of aqueous and organic liquid systems. Illustratively, it has been successfully applied to the analysis of a number of aqueous wastes' brines from subterranean formations and a wide variety of liquid petroleum products.

What is claimed is:

1. A method for determining the inorganic carbon content of a liquid which comprises
   (1) passing a carrier gas stream substantially free of carbon dioxide through a heating conduit having a heating zone at a temperature above about 100° C. and below that temperature at which organic carbon components of the liquid undergo decomposition, within which heating zone there is an acid-surfaced, carbonate-reactive body,
   (2) introducing a small predetermined amount of the liquid to be analyzed onto the carbonate-reactive body to convert non-volatile inorganic carbon to carbon dioxide, and release dissolved carbon dioxide from said liquid, and
   (3) then sweeping the gaseous product formed in the heating zone into an analyzer for quantitatively indicating the carbon dioxide content of a gas stream.

2. A method for determining the inorganic carbon content of a liquid which comprises
   (1) passing a carrier gas stream substantially free of carbon dioxide through a heating conduit having a heating zone at a temperature within the range from about 100 up to about 250° C., within which heating zone there is an acid-surfaced, carbonate-reactive body,
   (2) forcibly injecting a small predetermined amount of the liquid to be analyzed onto the carbonate-reactive body to convert non-volatile inorganic carbon to carbon dioxide from said liquid, and
   (3) then sweeping the gaseous product formed in the heating zone into an analyzer for quantitatively indicating the carbon dioxide content of a gas stream.

3. A method as in claim 2 wherein the carbonate-reactive body is formed from phosphoric acid coated particulate solids.

4. A process as in claim 2 wherein the temperature in the heating zone is from about 150 up to about 200° C.

5. A method for determining the inorganic carbon content of a liquid which comprises
   (1) passing a carrier gas stream substantially free of carbon dioxide at a constant flow rate through a heating conduit having a heating zone at a temperature within the range from about 100 up to about 250° C., within which heating zone, and occupying the cross-section thereof, there is a gas-permeable, acid-surfaced, carbonate-reactive body,
   (2) injecting a small predetermined amount of the liquid to be analyzed onto the carbonate-reactive body to convert non-volatile inorganic carbon to carbon dioxide and to release dissolved carbon dioxide from said liquid, and
   (3) then sweeping the gaseous product formed in the heating zone into an analyzer for quantitatively indicating the carbon dioxide content of a gas stream.

6. A method for determining the inorganic carbon content of a liquid which comprises
   (1) passing a carrier gas stream substantially free of carbon dioxide at a constant flow rate through a heating conduit having a heating zone at a temperature within the range from about 100 up to about 250° C., within which heating zone, and occupying the cross-section thereof, there is a gas-permeable, acid-surfaced, carbonate-reactive body,
   (2) injecting a small predetermined amount of the liquid to be analyzed onto the carbonate-reactive body to convert non-volatile inorganic carbon to carbon dioxide and to release dissolved carbon dioxide from said liquid, and
   (3) then sweeping the gaseous product formed in the heating zone into an analyzer which produces an electrical signal relative to the amount of carbon dioxide in the gaseous product, which electrical signal is fed to a recorder, and calibrating the recorded indicia of the carbon dioxide concentration in the gaseous product against data obtained by analyzing aqueous systems having known inorganic carbon contents under comparable operating conditions, whereby the inorganic carbon content of the liquid is determined.

7. A method as in claim 6 wherein the liquid is an aqueous dispersion containing up to 500 parts per million of inorganic carbon.

8. A method for determining the inorganic carbon content of a liquid which comprises
   (1) passing air substantially free of carbon dioxide at a constant flow rate within the range from about 1 to about 4 bed volumes per minute through a heating conduit having a heating zone at a temperature within the range from about 100 up to 250° C. within which heating zone, and occupying the cross-section thereof, there is a gas-permeable, acid-surfaced, carbonate-reactive body formed of phosphoric acid coated particulate solids,
   (2) injecting a small predetermined amount of the liquid to be analyzed onto the carbonate-reactive body to convert non-volatile inorganic carbon dioxide and to release dissolved carbon dioxide from said liquid, and
   (3) then sweeping the gaseous products formed in the heating zone into an analyzer which produces an electrical signal relative to the amount of carbon dioxide in the gaseous product, which electrical signal is fed to a recorder, and calibrating the recorded indicia of the carbon dioxide concentration in the gaseous product against data obtained by analyzing aqueous systems having known inorganic carbon contents under comparable operating conditions, whereby the inorganic carbon content of the liquid is determined.

9. An apparatus for determining the inorganic carbon content of a liquid, which apparatus comprises
   (1) carrier gas flow control means for producing a confined, continuous carrier gas stream which is substantially free of carbon dioxide from a pressurized source of supply,
   (2) a heating conduit having an inlet and an outlet, said heating conduit being coupled at the inlet to the carrier gas flow control means and having a heating zone in which there is an acid-surfaced, carbonate-reactive body, sample injection means coupled to said heating conduit for impinging a small amount of the liquid to be analyzed onto the carbonate-reactive body whereby non-volatile inorganic carbon is converted to carbon dioxide and dissolved carbon dioxide is released from said liquid,
   (3) heating means in heat exchange relationship with the heating conduit for maintaining the heating zone thereof at a temperature above about 100° C. and below the decomposition temperature of organic carbon components of the liquid to be analyzed,
   (4) carbon dioxide detection means coupled to the outlet of the heating conduit for quantitatively indicating the carbon dioxide in the gaseous product from the heating zone,
said carrier gas flow control means, heating conduit, and carbon dioxide detection means being connected in the order specified by interconnecting coupling means providing a continuous gas train.

10. An apparatus as in claim 9 wherein the carbonate-reactive body is formed from phosphoric acid coated particulate solids and said body occupies substantially the entire cross-section of the heating conduit.

11. An apparatus as in claim 9 wherein the heating means is adapted to provide temperature within the range from about 100 up to about 250° C.

12. An apparatus for determining the inorganic carbon content of a liquid, which apparatus comprises
   (1) carrier gas flow control means for producing a confined, continuous carrier gas stream substantially free of carbon dioxide at a constant flow rate from a pressurized source of supply,
   (2) a heating conduit having an inlet and an outlet, said heating conduit being coupled at the inlet to the carrier gas flow control means and having a heating zone in which there is an acid-surface, carbonate-reactive body,
   (3) sample injection means operatively coupled with the heating conduit for forcibly injecting the liquid to be analyzed onto the carbonate-reactive body whereby non-volatile inorganic carbon is converted to carbon dioxide and dissolved carbon dioxide is released from said liquid,
   (4) heating means in heat exchange relationship with the heating conduit for maintaining the heating zone thereof at a temperature above about 100° C. and below the decomposition temperature of organic carbon components of the liquid to be analyzed,
   (5) cooling means connected to the outlet of the heating conduit in which the temperature of the gaseous product received from the heating zone is lowered, and integral with such cooling means, condensate removal means wherein condensate is separated from the cooled gaseous product, and
   (6) carbon dioxide detection means coupled to the cooling means for quantitatively indicating the carbon dioxide in the gaseous product from the heating zone,
said carrier gas flow control means, heating conduit, cooling means, condensate removal means, and carbon dioxide detection means being connected in the order specified by interconnecting coupling means providing a continuous gas train.

13. An apparatus as in claim 12, wherein the carbon dioxide detection means is a non-dispersive, infrared analyzer, sensitized to carbon dioxide, which analyzer produces a variable electrical signal.

14. A method of determining the inorganic carbon content of a liquid which comprises
   (a) introducing a predetermined amount of the liquid to be analyzed to an enclosed acid-surfaced carbonate-reactive body to convert non-volatile inorganic carbon to carbon dioxide and release dissolved carbon dioxide from said liquid which is maintained at a temperature above the temperature required to vaporize said liquid and below that temperature at which organic carbon components of the liquid undergo decomposition, and, after a predetermined time interval,
   (b) advancing any gaseous product away from said carbonate-reactive body and into an analyzer for quantitatively indicating the carbon dioxide content of a gas stream.

15. A method in accordance with claim 14, wherein said gaseous product is advanced by means of a carrier gas which is substantially free of carbon dioxide.

16. A method in accordance with claim 14, wherein said gaseous product is advanced by means of a carrier gas which contains a small but substantially uniformly dispersed amount of carbon dioxide.

17. A method in accordance with claim 14, wherein a carrier gas is continuously advanced through said enclosed carbonate-reactive body at a rate sufficient to provide said predetermined residence time for said liquid to react with said carbonate-reactive body.

18. A method in accordance with claim 14, wherein the introduction of said liquid is by injection onto said carbonate-reactive body.

19. An apparatus for determining the inorganic carbon content of a liquid, which apparatus comprises
   (1) a heating conduit having an inlet and an outlet and having a heating zone in which there is an acid-surfaced, carbonate-reactive body, sample introduction means coupled to said heating conduit for impinging a small amount of the liquid to be analyzed onto the carbonate-reactive body whereby non-volatile inorganic carbon is converted to carbon dioxide and dissolved carbon dioxide is released from said liquid,
   (2) heating means in heat exchange relationship with the heating conduit for maintaining the heating zone thereof at a temperature above the vaporizing temperature of said liquid and below the decomposition temperature of organic carbon components of the liquid to be analyzed,
   (3) means including a carrier gas coupled to said inlet for advancing vaporized material from said heating conduit and through
   (4) carbon dioxide detection means coupled to the outlet of the heating conduit for quantitatively indicating the carbon dioxide in the gaseous product from the heating zone.

20. Apparatus in accordance with claim 19, wherein said means including a carrier gas provides a continuous gas flow through said heating conduit.

21. Apparatus in accordance with claim 19, wherein said means including a carrier gas includes valve means for interrupting gas flow through said heating conduit.

References Cited
UNITED STATES PATENTS
3,296,435  1/1967  Teal et al. _____ 260—43.5

WILLIAM F. LINDQUIST, Primary Examiner